United States Patent
Nagatsuka (10) Patent No.: US 12,521,079 B2
(45) Date of Patent: Jan. 13, 2026

(54) EXPOSURE DOSE MANAGEMENT SYSTEM, DYNAMIC IMAGING SUPPORT APPARATUS, COMPUTER-READABLE MEDIUM, AND EXPOSURE DOSE MANAGEMENT METHOD

(71) Applicant: Konica Minolta, Inc., Tokyo (JP)

(72) Inventor: Sumiya Nagatsuka, Hino (JP)

(73) Assignee: Konica Minolta, Inc., Tokyo (JP)

( * ) Notice: Subject to any disclaimer, the term of this patent is extended or adjusted under 35 U.S.C. 154(b) by 279 days.

(21) Appl. No.: 18/493,068

(22) Filed: Oct. 24, 2023

(65) Prior Publication Data

US 2024/0138800 A1    May 2, 2024

(30) Foreign Application Priority Data

Nov. 1, 2022 (JP) .................. 2022-175365

(51) Int. Cl.
| | | |
|---|---|---|
| G01T 1/02 | (2006.01) | |
| A61B 6/00 | (2006.01) | |
| G16H 40/63 | (2018.01) | |

(52) U.S. Cl.
CPC ................ *A61B 6/542* (2013.01); *G01T 1/02* (2013.01); *G16H 40/63* (2018.01)

(58) Field of Classification Search
CPC .......... A61B 6/542; G16H 40/63; G01T 1/02
See application file for complete search history.

(56) References Cited

U.S. PATENT DOCUMENTS 10,993,690 B2 *   5/2021   Ishii ..................... G01T 1/2907
2024/0138796 A1 * 5/2024   Boufahja ............... G16H 20/40

FOREIGN PATENT DOCUMENTS

| JP | 2007-181686 A | | 7/2007 | |
| JP | 2021149227 A | * | 3/2020 | ............... A61B 6/00 |

* cited by examiner

*Primary Examiner* — David P Porta
*Assistant Examiner* — Fani Polyzos Boosalis
(74) *Attorney, Agent, or Firm* — Lucas & Mercanti, LLP (57) ABSTRACT

Disclosed is an exposure dose management system including a first hardware processor that: manages exposure doses that a subject has received through imaging by a radiographic imaging apparatus in association with an imaging date and time; accepts a designation of a predetermined period; calculates a cumulative exposure dose obtained by accumulating exposure doses for which the imaging date and time corresponding to each exposure dose is included in the predetermined period from among the exposure doses managed by the first hardware processor; and outputs the cumulative exposure dose.

12 Claims, 9 Drawing Sheets

| | TISSUE WEIGHTING COEFFICIENT | |
|---|---|---|
| | ICRP Publ.60 (1990) | ICRP Publ.103 (2007) |
| GONADS | 0.20 | 0.08 |
| LUNGS | 0.12 | 0.12 |
| BREASTS | 0.05 | 0.12 |
| THYROID | 0.05 | 0.04 |
| ⋮ | ⋮ | ⋮ |

| PATIENT C 2006 MANAGEMENT DATA | | | | | |
|---|---|---|---|---|---|
| IMAGING SITE | GONADS | BREASTS | LUNGS | THYROID | TOTAL |
| EXPOSURE DOSE | 0.60mSv | 0.25mSv | 0.36mSv | 0.10mSv | 1.31mSv |

FIG.11B

| PATIENT C 2006 DATA BEFORE ADJUSTMENT BY TISSUE WEIGHTING COEFFICIENT | | | | |
|---|---|---|---|---|
| IMAGING SITE | GONADS | BREASTS | LUNGS | THYROID |
| EXPOSURE DOSE | 3mSv | 5mSv | 3mSv | 2mSv |

FIG.11C

| PATIENT C 2006 DATA AFTER ADJUSTMENT BY LATEST TISSUE WEIGHTING COEFFICIENT | | | | | |
|---|---|---|---|---|---|
| IMAGING SITE | GONADS | BREASTS | LUNGS | THYROID | TOTAL |
| EXPOSURE DOSE | 0.24mSv | 0.60mSv | 0.36mSv | 0.08mSv | 1.28mSv |

FIG.12A

|  | 2020 | 2021 | 2022 | 2023 |
|---|---|---|---|---|
| ANNUAL EXPOSURE DOSE | 70mSv | 20mSv | 20mSv | 20mSv |
| CUMULATIVE EXPOSURE DOSE (NOT CONSIDERING DECAY) | 70mSv | 90mSv | 110mSv | 130mSv |
| REMAINING ANNUAL PERMISSIBLE DOSE |  |  | 30mSv | 30mSv |

FIG.12B

|  | 2020 | 2021 | 2022 | 2023 |
|---|---|---|---|---|
| ANNUAL EXPOSURE DOSE | 70mSv | 20mSv | 20mSv | 20mSv |
| NO DECAY | 70mSv | 10mSv | 10mSv | 10mSv |
| NUCLEAR MEDICINE EXAMINATION |  | 10mSv | 10mSv | 10mSv |
| CUMULATIVE EXPOSURE DOSE (CONSIDERING DECAY) | 70mSv | 90mSv | 109.9mSv | 129.7mSv |
| REMAINING ANNUAL PERMISSIBLE DOSE |  |  | 30mSv | 30mSv |

EXPOSURE DOSE MANAGEMENT SYSTEM, DYNAMIC IMAGING SUPPORT APPARATUS, COMPUTER-READABLE MEDIUM, AND EXPOSURE DOSE MANAGEMENT METHOD

CROSS-REFERENCE TO RELATED APPLICATIONS

The entire disclosure of Japanese Patent Application No. 2022-175365 filed on Nov. 1, 2022 is incorporated herein by reference in its entirety.

BACKGROUND

Technological Field

The present invention relates to an exposure dose management system, a dynamic imaging support apparatus, a computer-readable medium, and an exposure dose management method.

Description of the Related Art

In Japan, the Ministerial Ordinance for partially revising the Enforcement Regulations on the Medical Care Act came into effect on Apr. 1, 2020, making dose management mandatory for high-dose imaging apparatus. Examples of the objects of dose management include CT X-ray apparatus, fluoroscopic X-ray apparatus used for angiography, diagnostic radioisotopes, and positron emission tomography diagnostic radioisotopes. On the other hand, in the United States, a problem of excessive irradiation by X-ray CT apparatus occurred in 2007. This issue led to the initiation of the American College of Radiology (ACR)-led Dose Index Registry (ACR DIR) for CT from around 2011.

Further, in long-term patient dose management, it is known to manage the whole life radiation dose accumulated over the whole life of a patient, the mean annual dose rate, and the like, and to convert between various units of radiation (gray, sievert, and the like) (see JP 2007-181686 A).

Furthermore, a dose management apparatus has been proposed in which the amount of radiation used for imaging is compared with thresholds corresponding to examination types and an alert is provided (see JP 2021-149227 A).

SUMMARY

As described above, in Japan, mandatory dose management has only just started, and is limited to high-dose imaging apparatus. However, in order to appropriately manage patient exposure, it is desirable to also perform dose management in apparatus other than the above-described imaging apparatus.

The present invention has been made in view of the above-described problem in the related art, and an object of the present invention is to provide a user with an appropriate exposure dose.

To achieve at least one of the abovementioned objects, according to an aspect of the present invention, an exposure dose management system reflecting one aspect of the present invention comprises a first hardware processor that:
  manages exposure doses that a subject has received through imaging by a radiographic imaging apparatus in association with an imaging date and time;
  accepts a designation of a predetermined period;
  calculates a cumulative exposure dose obtained by accumulating exposure doses for which the imaging date and time corresponding to each exposure dose is included in the predetermined period from among the exposure doses managed by the first hardware processor; and
  outputs the cumulative exposure dose.

To achieve at least one of the abovementioned objects, according to another aspect of the present invention, a dynamic imaging support apparatus reflecting one aspect of the present invention comprises a second hardware processor that:
  acquires a cumulative exposure dose outputted from the exposure dose management system; and
  identifies imaging parameters for dynamic imaging of the subject on a basis of the cumulative exposure dose, and presents the imaging parameters.

To achieve at least one of the abovementioned objects, according to yet another aspect of the present invention, a non-transitory computer-readable medium reflecting one aspect of the present invention stores a program for causing a computer to perform:
  managing exposure doses that a subject has received through imaging by a radiographic imaging apparatus in association with an imaging date and time;
  accepting a designation of a predetermined period;
  calculating a cumulative exposure dose obtained by accumulating exposure doses for which the imaging date and time corresponding to each exposure dose is included in the predetermined period from among the exposure doses managed by the manager; and
  outputting the cumulative exposure dose.

To achieve at least one of the abovementioned objects, according to yet another aspect of the present invention, a dose management method reflecting one aspect of the present invention comprises:
  managing exposure doses that a subject has received through imaging by a radiographic imaging apparatus in association with an imaging date and time;
  accepting a designation of a predetermined period;
  calculating a cumulative exposure dose obtained by accumulating exposure doses for which the imaging date and time corresponding to each exposure dose is included in the predetermined period from among the managed exposure doses; and
  outputting the cumulative exposure dose.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION OF EMBODIMENTS

Hereinafter, embodiments of an exposure dose management system according to the present invention will be described. Note that the present invention is not limited to the examples illustrated in the drawings.

Configuration of Medical Information Management System

Figure 1:
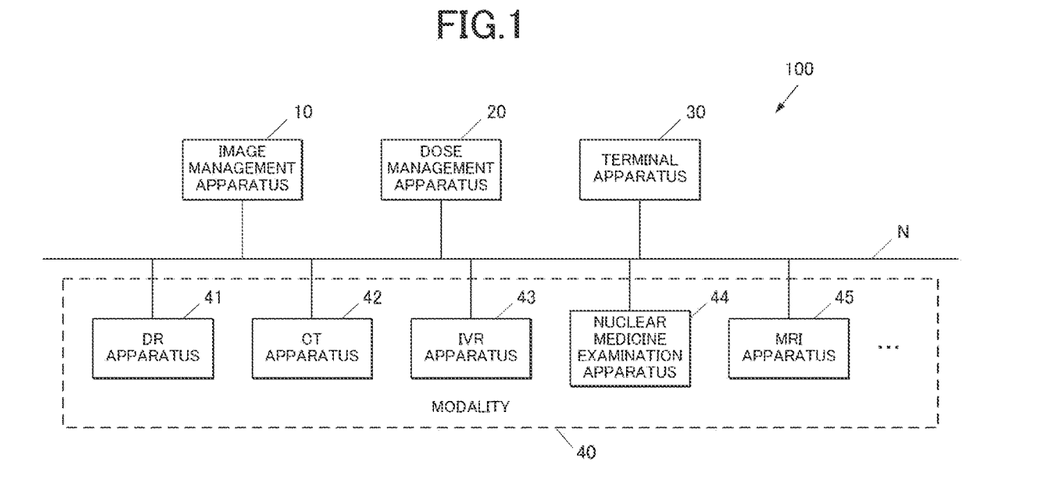
FIG. 1 is a diagram illustrating a system configuration example of a medical information management system.

FIG. 1 illustrates a system configuration example of a medical information management system 100 as an exposure dose management system.

As illustrated in FIG. 1, the medical information management system 100 includes an image management apparatus 10, a dose management apparatus 20, a terminal apparatus 30, a modality 40, and the like. The respective apparatus included in the medical information management system 100 are interconnected via a communication network N, such as a local area network (LAN) and/or a wide area network (WAN), to allow for the transmission and reception of data. Each apparatus included in the medical information management system 100 conforms to the Health Level Seven (HL7) and the Digital Image and Communications in Medicine (DICOM) standards. Communication between respective apparatus included in the medical information management system 100 is performed in accordance with HL7 and DICOM. The medical information management system 100 may include a plurality of terminal apparatus 30.

The modality 40 is an image generation apparatus such as a digital radiography (DR) apparatus 41, a computed tomography (CT) apparatus 42, an interventional radiology (IVR) apparatus 43, a nuclear medicine examination apparatus 44, and a magnetic resonance imaging (MRI) apparatus 45. The IVR apparatus 43 is used for an angiography examination.

The modality 40 images a patient and generates image data of a medical image. The modality 40 writes supplementary information in a header of an image file of the medical image in accordance with the DICOM standard. Thus, the modality 40 attaches the supplementary information to the medical image and generates a DICOM image file. The supplementary information includes patient information, examination information, series information, image information, and the like.

The patient information is information pertaining to a patient. The patient information includes a patient ID, My Number(R), patient name, date of birth, sex, height, weight, age, BMI, and the like. The patient ID is identification information for the subject (patient) subjected to imaging. The My Number (personal number) is a number assigned to a person holding a certificate of residence in Japan, and is the My Number corresponding to the subject (patient).

The examination information is information pertaining to an examination. The examination information includes an examination ID, an imaging date and time (examination date and time), an examination description, and the like.

The series information is information pertaining to a series. The series information includes a series instance UID, a series number, a modality, an imaging site, a series description, and the like.

The image information is information pertaining to an image. The image information includes an SOP instance UID, an image number, and the like. The image number is a number indicating the imaging order of a tomographic image (CT image) generated by one scan.

The modality 40 includes radiographic imaging apparatus and other imaging apparatus.

The radiographic imaging apparatus includes an apparatus that irradiates a subject with radiation to image the subject, and the nuclear medicine examination apparatus 44. The nuclear medicine examination apparatus 44 is, for example, a positron emission tomography (PET) apparatus, a single photon emission computed tomography (SPECT) apparatus, or the like. The nuclear medicine examination apparatus 44 generates a medical image by imaging radiation emitted to the outside of the body in a state in which a radioisotope has been inhaled or injected into the body of a patient.

The MRI apparatus 45 is an imaging apparatus other than a radiographic imaging apparatus.

If the modality 40 is a radiographic imaging apparatus, the modality 40 generates a radiation dose structured report (RSDR) as dose information about an examination performed in the modality 40. An RDSR is information conforming to the DICOM standard, and is a data format for representing dose information. The dose information is information related to an irradiation dose (amount of energy) of radiation with which the subject is irradiated in a radiological examination. The dose information includes an index representing the irradiation dose. The index representing the irradiation dose is the dose length product (DLP), CTDIvol, area dose, or the like. In addition, the dose information can also include information such as the voltage and current applied to emit radiation and the radiation emission time. The dose information includes supplementary information (patient information, examination information, series information, and image information) of the medical image.

The modality 40 transmits the medical image to the image management apparatus 10 and transmits the dose information to the dose management apparatus 20.

The image management apparatus 10 stores medical images generated by the modality 40 for each patient and for each examination, and manages the medical images. The image management apparatus 10 may be a picture archiving and communication system (PACS), for example.

The dose management apparatus 20 is a computer apparatus that manages dose information related to the radiographic imaging of medical images. The dose management apparatus 20 has dose recording and dose management functions.

Dose recording involves recording and accumulating information obtained by radiographing an individual patient.

Dose management involves managing dose information. Dose management includes determining, on the basis of accumulated dose information, whether the dose exceeds a threshold value, how long until the dose reaches an upper limit, which modality 40 dose information is to be managed, and the like.

Figure 2:
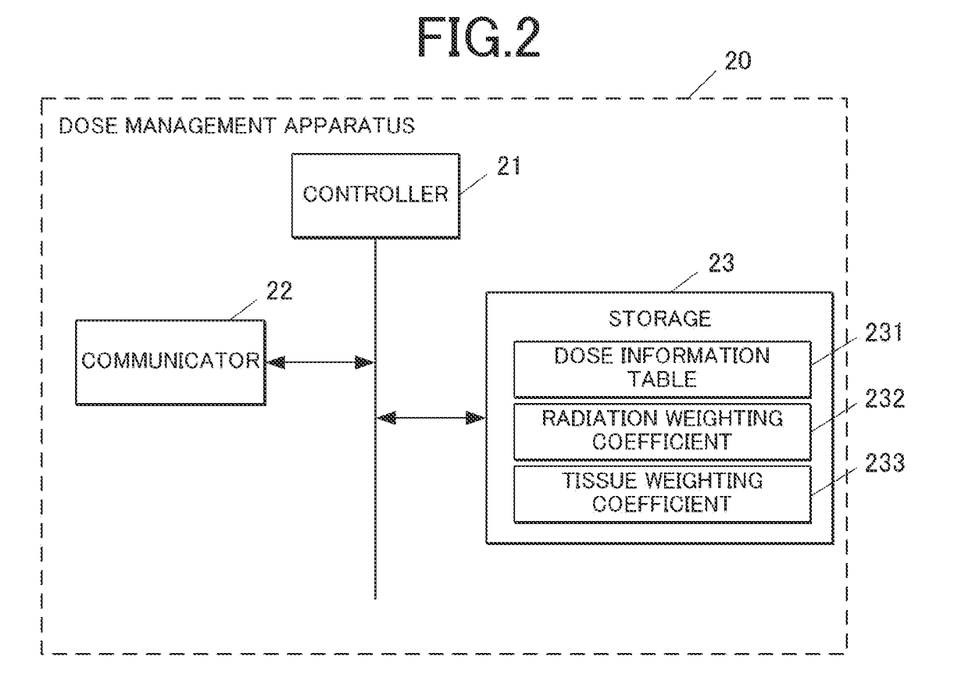
FIG. 2 is a block diagram illustrating a functional configuration of a dose management apparatus.

FIG. 2 illustrates a functional configuration of the dose management apparatus 20.

As illustrated in FIG. 2, the dose management apparatus 20 includes a controller 21 (first hardware processor), a communicator 22, a storage 23, and the like. The sections included in the dose management apparatus 20 are connected by a bus.

The controller 21 includes a central processing unit (CPU), read only memory (ROM), random access memory (RAM), and the like. The controller 21 centrally controls processing operations by each section of the dose management apparatus 20. Specifically, the CPU reads various processing programs stored in the ROM, loads the programs into the RAM, and executes various processes in cooperation with the programs.

The communicator 22 includes a network interface and the like, and transmits and receives data to and from external apparatus connected via the communication network N. For example, the communicator 22 receives dose information (RDSR) obtained by imaging a patient from the modality 40. Further, the communicator 22 may receive dose information from the image management apparatus 10.

The storage 23 includes a hard disk drive (HDD), non-volatile semiconductor memory, or the like, and stores various types of data. For example, the storage 23 stores a dose information table 231, a radiation weighting coefficient 232, and a tissue weighting coefficient 233.

The dose information table 231 stores, in a searchable manner, dose information pertaining to each examination for a medical image generated by a radiographic imaging apparatus among medical images managed by the image management apparatus 10.

Figure 3:
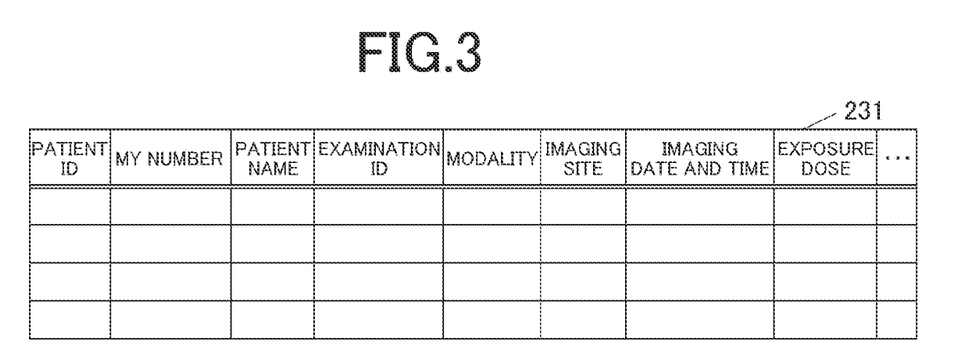
FIG. 3 is a diagram illustrating a data structure of a dose information table.

FIG. 3 illustrates a data structure of the dose information table 231. In the dose information table 231, a patient ID, My Number, patient name, examination ID, modality, imaging site, imaging date and time, exposure dose, and the like are associated with each other.

The patient ID is a patient ID of the subject (patient) subjected to imaging.

The My Number is the My Number of the subject (patient) subjected to imaging.

The patient name is the name of the subject (patient) subjected to imaging.

The examination ID corresponds to an examination in which the subject (patient) has received an exposure dose managed in the dose information table 231.

The modality is an imaging apparatus corresponding to an examination.

The imaging site is the part of the body subjected to imaging.

The imaging date and time is date and time when imaging was performed.

The exposure dose is the exposure dose that the subject (patient) received. The exposure dose includes, for example, DLP, CTDIvol, or area dose.

The radiation weighting coefficient 232 is a coefficient related to the influence of radiographic imaging and is a coefficient for adjusting a difference in influence depending on the type of radiation with respect to an exposure dose. Types of radiation include alpha rays, beta rays, gamma rays, and neutrons. An equivalent dose is calculated by multiplying the absorbed dose for each tissue or organ by the radiation weighting coefficient 232 corresponding to the type of radiation.

The tissue weighting coefficient 233 is a coefficient related to the influence of radiographic imaging, and is a coefficient for adjusting a difference in the sensitivity of tissues and organs with respect to an exposure dose. An effective dose is calculated by multiplying the equivalent dose for each tissue/organ by the tissue weighting coefficient 233 corresponding to the tissue/organ and adding up the products.

Figure 4:
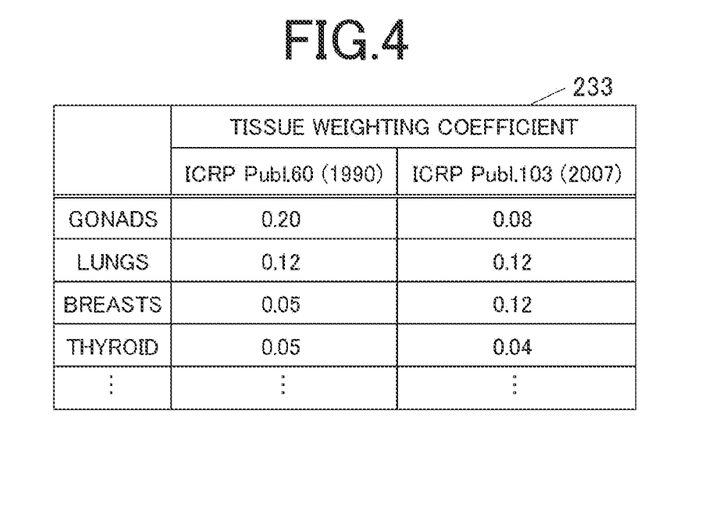
FIG. 4 is an example of a tissue weighting coefficient.

FIG. 4 illustrates an example of the tissue weighting coefficient 233. FIG. 4 includes the tissue weighting coefficients of the 1990 recommendations and the 2007 recommendations of the International Commission on Radiological Protection (ICRP).

The controller 21 manages the exposure dose received by the subject through imaging by radiographic imaging apparatus in association with the imaging date and time. That is, the controller 21 functions as a manager.

Specifically, the controller 21 receives dose information from the modality 40 (radiographic imaging apparatus). The controller 21 stores, in the dose information table 231, pieces of information (patient ID, My Number, patient name, examination ID, modality, imaging site, imaging date and time, exposure dose, and the like) included in the dose information in association with each other. Accordingly, the controller 21 manages the exposure dose in association with the My Number of the subject. The controller 21 manages the exposure dose for each imaging site in the dose information table 231. Further, the controller 21 manages the exposure dose for each radiographic imaging apparatus (modality) in the dose information table 231.

The controller 21 receives designation of a predetermined period from an input device 33 (see FIG. 5) of the terminal apparatus 30. That is, the controller 21 functions as an acceptance section.

The controller 21 calculates a cumulative exposure dose obtained by accumulating the exposure doses for which the imaging date and time corresponding to the exposure dose is included in the designated predetermined period among the exposure doses managed in the dose management apparatus 20. That is, the controller 21 functions as a calculator.

The predetermined period may be, for example, a period of time going back from the latest radiographic imaging.

The predetermined period may be in units of months or years.

The controller 21 outputs the calculated cumulative exposure dose. That is, the controller 21 functions as an output section.

Specifically, the controller 21 causes a display 32 (see FIG. 5) of the terminal apparatus 30 to display the cumulative exposure dose.

The exposure doses include external exposure doses and internal exposure doses.

An external exposure dose is a dose of radiation received from a radiation source outside the body. Examples of external exposure include exposures by DR, CT, IVR, radiation therapy, and the like.

An internal exposure dose is a dose of radiation received from a source inside the body. Examples of internal exposure include an exposure by a nuclear medicine examination.

The controller 21 may calculate the total exposure dose by summing only the external exposure doses for which the imaging date and time corresponding to the exposure dose is included in the designated predetermined period among the exposure doses managed in the dose management apparatus 20. The controller 21 determines whether an exposure dose is an external exposure dose or an internal exposure dose on the basis of the type of the modality 40 involved in the examination, for example. In the case of PET/CT examinations, the controller 21 determines that FDG injected into the body in a PET examination is an internal exposure dose, and determines that FDG injected into the body in a CT examination is an external exposure dose.

The controller 21 may output only the calculated total exposure dose (the sum of only external exposure doses).

The controller 21 uses the latest coefficients related to the influence of radiographic imaging to adjust exposure doses for which the imaging date and time is within the predetermined period. The radiation weighting coefficient 232 and the tissue weighting coefficient 233 are used as the coefficients related to the influence of radiographic imaging.

The controller 21 calculates the cumulative exposure dose after first converting exposure doses for which the imaging date and time is within the predetermined period into a single unit of radiation. The sievert (Sv), the gray (Gy), the becquerel (Bq), or the like is used as the unit of radiation. For example, units are converted according to 1 Gy=0.8 Sv.

The terminal apparatus 30 is a computer apparatus such as a personal computer (PC) used by a doctor or other healthcare professional. The healthcare professional browses medical images, dose information, and the like related to examinations on the terminal apparatus 30. The terminal apparatus 30 is also used as an imaging control apparatus for the modality 40.

Figure 5:
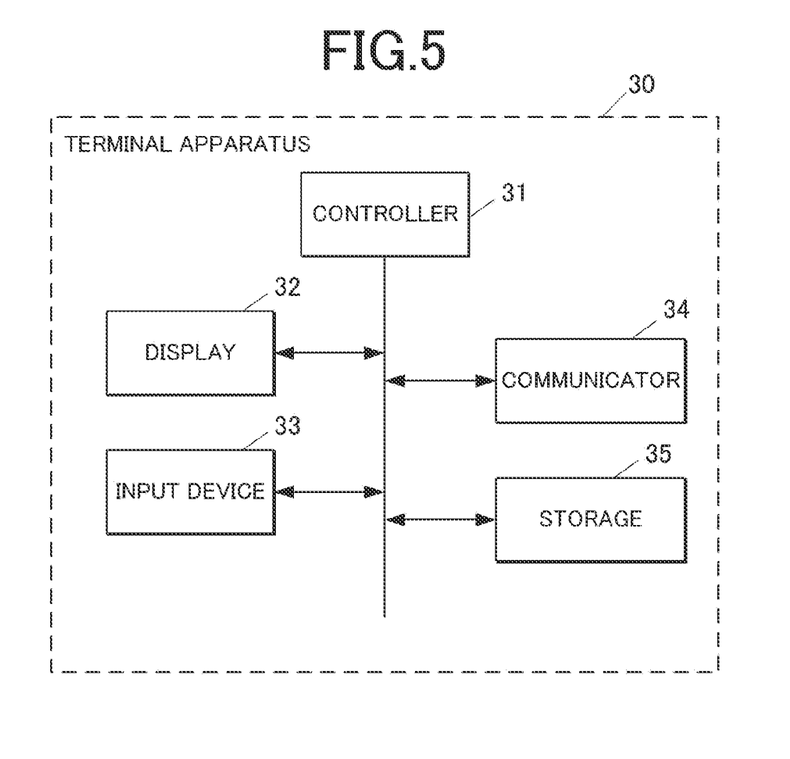
FIG. 5 is a block diagram illustrating a functional configuration of a terminal apparatus.

FIG. 5 illustrates a functional configuration of the terminal apparatus 30.

As illustrated in FIG. 5, the terminal apparatus 30 includes a controller 31 (second hardware processor), a display 32, an input device 33, a communicator 34, a storage 35, and the like. The sections included in the terminal apparatus 30 are connected by a bus.

The controller 31 includes a CPU, ROM, RAM, and the like. The controller 31 centrally controls processing operations by each section of the terminal apparatus 30. Specifically, the CPU reads various processing programs stored in the ROM, loads the programs into the RAM, and executes various processes in cooperation with the programs.

The display 32 includes a monitor such as a liquid crystal display (LCD). The display 32 displays various screens according to instructions in a display signal inputted from the controller 31.

The input device 33 includes a keyboard having cursor keys, letter/numeral input keys, various function keys, and the like, and a pointing device such as a mouse. The input device 33 outputs an operation signal inputted by a key operation on the keyboard or by a mouse operation to the controller 31.

The communicator 34 includes a network interface and the like, and transmits and receives data to and from external apparatus connected via the communication network N.

The storage 35 includes an HDD, nonvolatile semiconductor memory, or the like, and stores various types of data.

The controller 31 acquires the cumulative exposure dose outputted from the dose management apparatus 20 as the exposure dose management system. That is, the controller 31 functions as an acquisition section.

The controller 31 identifies imaging parameters for dynamic imaging of the subject on the basis of the cumulative exposure dose, and presents the identified imaging parameters. That is, the controller 31 functions as a presentation section, and the terminal apparatus 30 functions as a dynamic imaging support apparatus.

Dynamic imaging is the imaging of a dynamic state, such as changes of shape in the expansion and contraction of the lungs associated with respiratory motion, and pulsation of the heart. In dynamic imaging, the modality 40 repeatedly irradiates the subject with pulsed radiation such as X-rays at predetermined time intervals (pulse irradiation) or continuously irradiates the subject with a low dose of radiation without interruption (continuous irradiation), thereby acquiring a plurality of images indicating the dynamic state of the subject.

Since imaging time (irradiation time) is longer in dynamic imaging compared to static imaging, dynamic imaging is a factor that greatly affects the exposure dose.

Operation of Medical Information Management System

Next, the operation of the medical information management system 100 will be described.

Figure 6:
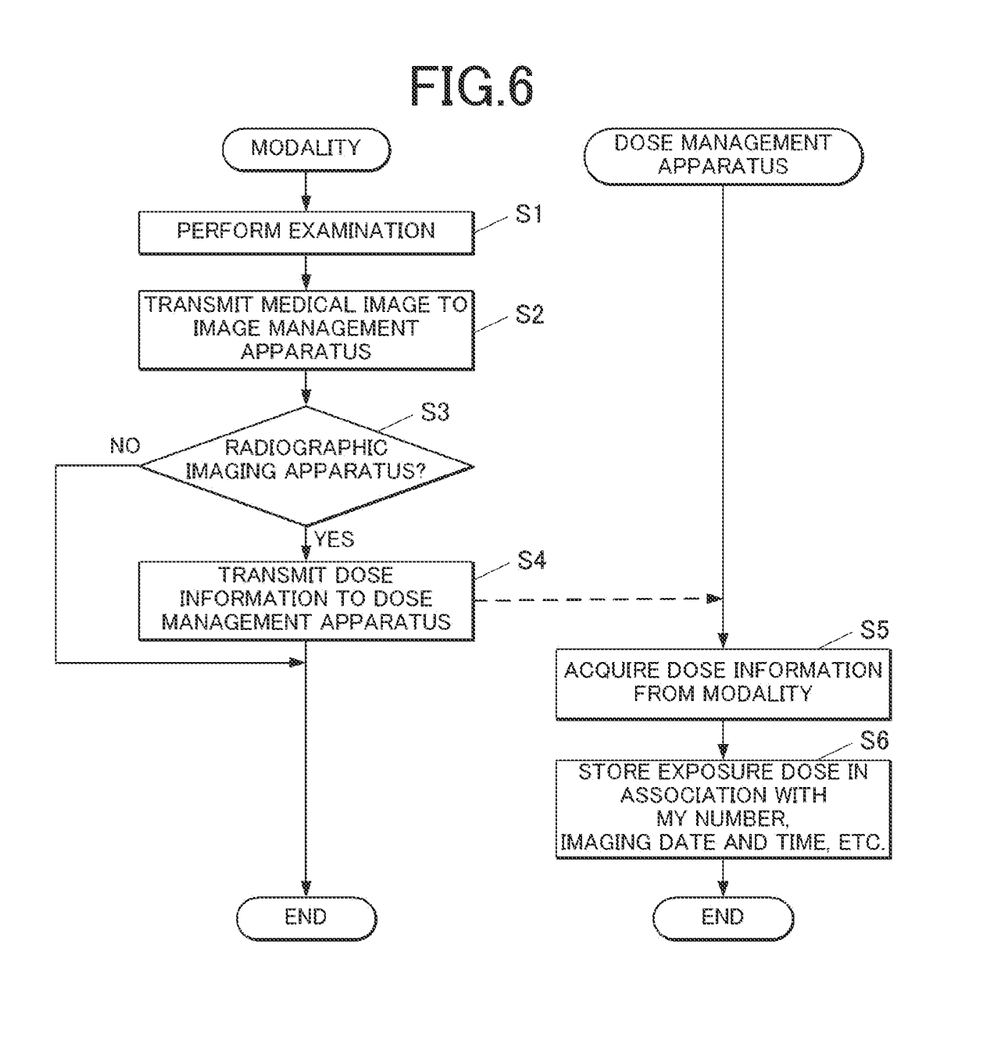
FIG. 6 is a ladder chart illustrating a dose information registration process executed in a modality and the dose management apparatus.

FIG. 6 is a ladder chart illustrating a dose information registration process executed in the modality 40 and the dose management apparatus 20. The dose information registration process is a process for registering dose information related to radiographic imaging in the dose management apparatus 20.

The modality 40 performs an examination on a subject (patient) (step S1). The modality 40 images the patient to generate image data of a medical image, and attaches supplementary information to the medical image in accordance with the DICOM standard. Further, in a case where the modality 40 is a radiographic imaging apparatus, the modality 40 generates dose information related to an examination performed in the modality 40.

Next, the modality 40 transmits the medical image to the image management apparatus 10 (step S2). The image management apparatus 10 stores the medical image received from the modality 40. The image management apparatus 10 can search for a medical image on the basis of search conditions such as the supplementary information of the medical image.

Next, in a case where the modality 40 is a radiographic imaging apparatus (step S3; YES), the modality 40 transmits the dose information to the dose management apparatus 20 (step S4).

In the dose management apparatus 20, the controller 21 acquires dose information from the modality 40 via the communicator 22 (step S5).

Next, the controller 21 causes the storage 23 to store each piece of information included in the dose information acquired from the modality 40 in association with each other (step S6). Specifically, the controller 21 stores the exposure dose in the dose information table 231 in association with the My Number, the imaging date and time, the patient ID, the patient name, the examination ID, the modality, the imaging site, and the like.

Note that in step S3, if the modality 40 is not a radiographic imaging apparatus (step S3; NO), there is no dose information related to the examination, and therefore the modality 40 does not transmit dose information. For example, in an examination using the MRI apparatus 45, a medical image is generated, but dose information is not generated.

Then, the dose information registration process ends.

Figure 7:
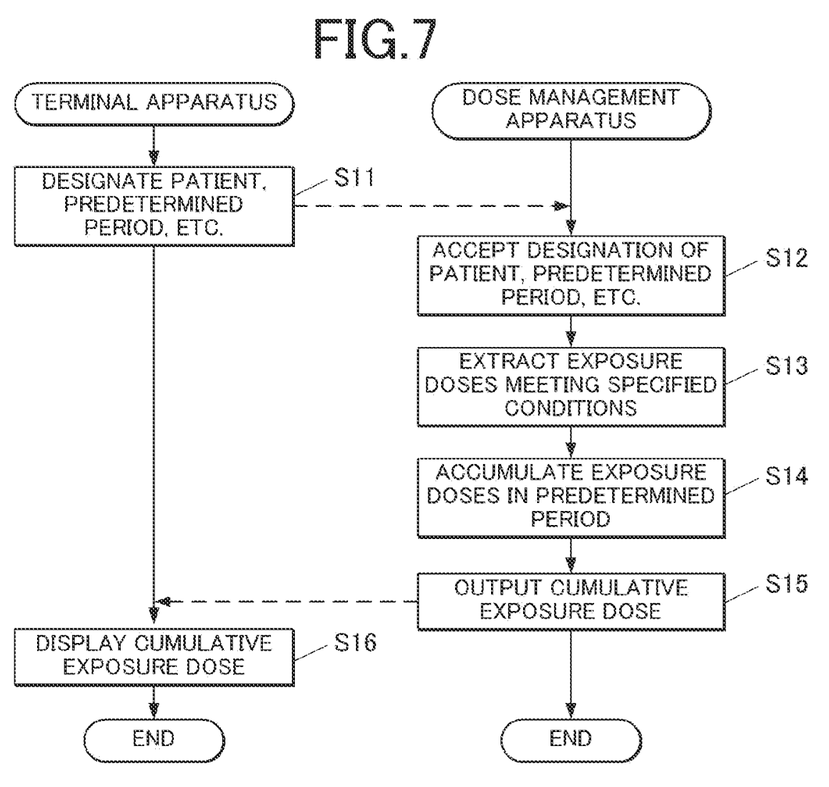
FIG. 7 is a ladder chart illustrating a dose information reference process executed in the terminal apparatus and the dose management apparatus.

FIG. 7 is a ladder chart illustrating a dose information reference process executed in the terminal apparatus 30 and the dose management apparatus 20. The dose information reference process is a process of referring to dose information managed in the dose management apparatus 20 from the terminal apparatus 30.

First, at the terminal apparatus 30, a condition designation screen provided by the dose management apparatus 20 is displayed on the display 32.

At the terminal apparatus 30, a user operates the input device 33 to designate conditions such as a patient and a predetermined period (step S11). For example, the user can designate the patient by patient ID, My Number, patient name, or the like. Further, the user may designate the predetermined period by specifying the beginning and the end of the period, or designate the predetermined period by year or by month. Furthermore, the user may specify the predetermined period as a period of time going back into the past from the latest radiographic imaging (examination result closest to the present), or as a period of time going back into the past from the present.

The controller 31 of the terminal apparatus 30 transmits the designated patient, predetermined period, and the like to the dose management apparatus 20 via the communicator 34.

In the dose management apparatus 20, the controller 21 receives the designation of the patient, predetermined period, and the like from the terminal apparatus 30 via the communicator 22 (step S12).

Next, the controller 21 extracts the data of an exposure dose that meets the designated conditions such as the patient and predetermined period (step S13). Specifically, the controller 21 extracts, from among the exposure doses managed in the dose information table 231 of the dose management apparatus 20, an exposure dose which corresponds to the designated patient and for which the "imaging date and time" is included in the designated predetermined period.

Next, the controller 21 accumulates the exposure doses related to examinations performed on the designated patient in the designated predetermined period, and calculates the cumulative exposure dose (step S14). If the units of exposure doses within the predetermined period are not the same, the controller 21 converts each exposure dose into a single unit of radiation before calculating the cumulative exposure dose. For example, the controller 21 accumulates the exposure doses after converting all units of radiation to the sievert (Sv).

Next, the controller 21 outputs the calculated cumulative exposure dose to the terminal apparatus 30 (step S15). The controller 21 generates screen data of a cumulative exposure dose display screen and provides the screen data to the terminal apparatus 30 via the communicator 22. The controller 21 may cause the terminal apparatus 30 to display the cumulative exposure dose as numerical data or may cause the terminal apparatus 30 to display the cumulative exposure dose in the form of a graph. When graphing the cumulative exposure dose, the controller 21 may allow the type of graph, such as a bar graph or a pie chart, to be selected in response to an operation from the terminal apparatus 30.

At the terminal apparatus 30, a cumulative exposure dose display screen is displayed on the display 32 (step S16).

Then, the dose information reference process ends.

Note that in step S14 of the dose information reference process (see FIG. 7), the controller 21 may also calculate a total exposure dose obtained by summing only the external exposure doses among the exposure doses for the designated patient within the designated predetermined period. Then, in step S15, the controller 21 may output the total exposure dose.

In addition, in step S14, the controller 21 may separately accumulate the external exposure doses and the internal exposure doses among the exposure doses for the designated patient within the designated predetermined period. Then, in step S15, the controller 21 may separately output the cumulative external exposure dose and the cumulative internal exposure dose.

Figure 8:
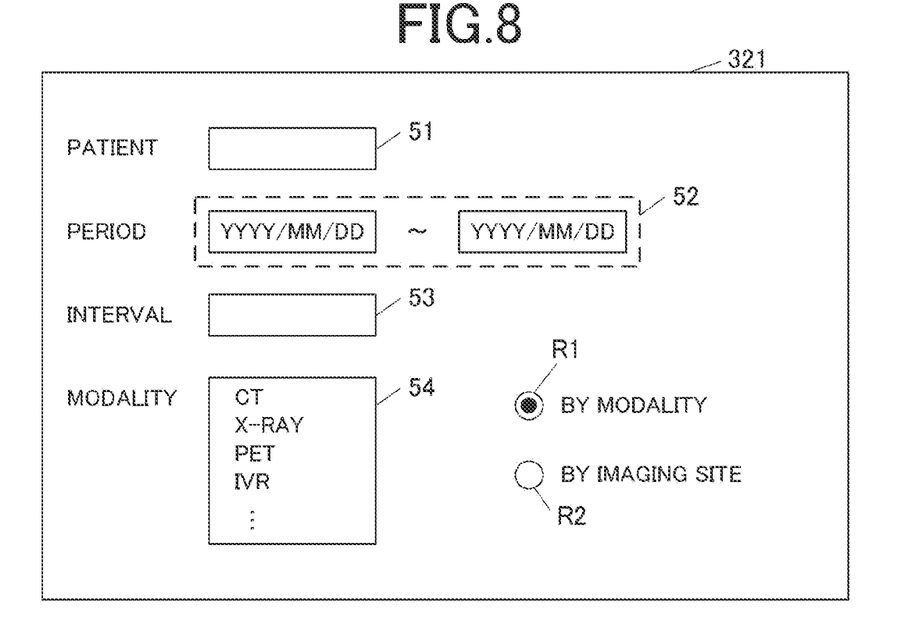
FIG. 8 is an example of a condition designation screen to be displayed on the terminal apparatus.

FIG. 8 illustrates a condition designation screen 321 displayed on the display 32 of the terminal apparatus 30. For example, the condition designation screen 321 is displayed on the display 32 of the terminal apparatus 30 in step S11 of the dose information reference process (see FIG. 7). The condition designation screen 321 includes a patient designation area 51, a period designation area 52, an interval designation area 53, a modality designation area 54, radio buttons R1 and R2, and the like.

The patient designation area 51 is an area for designating a patient.

The period designation area 52 is an area for designating a target period.

The interval designation area 53 is an area for designating the units of an interval (such as by year or by month) in the case of further subdividing the target period.

The modality designation area 54 is an area for designating a target modality 40. In the modality designation area 54, the user can designate one or a plurality of modalities 40.

The radio button R1 is selected when the cumulative exposure dose is to be calculated for each modality 40.

The radio button R2 is selected when the cumulative exposure dose is to be calculated for each imaging site.

Figure 9:
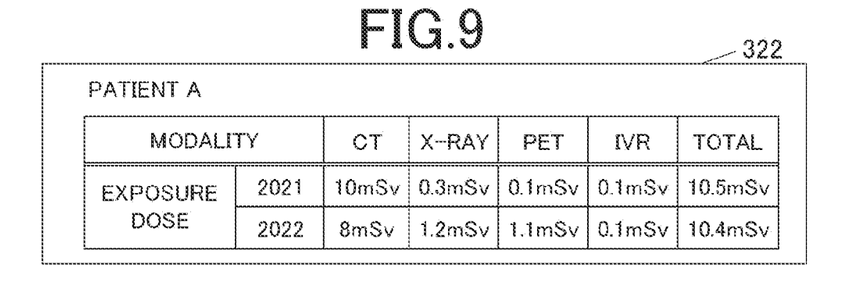
FIG. 9 is an example of a cumulative exposure dose display screen including a cumulative exposure dose calculated for each modality.

FIG. 9 illustrates a cumulative exposure dose display screen 322 displayed on the display 32 of the terminal apparatus 30. The cumulative exposure dose display screen 322 is an example of a screen displayed on the display 32 of the terminal apparatus 30 in step S16 of the dose information reference process (see FIG. 7). The cumulative exposure dose display screen 322 displays the cumulative exposure dose calculated for each "modality" for the "patient A". Here, it is assumed that the periods "2021" and "2022" have been designated.

The controller 21 of the dose management apparatus 20 extracts, from the dose information table 231 in the storage 23, records in which "patient A" is the subject and the imaging date and time is included in "2021". Then, the controller 21 accumulates the exposure doses included in the extracted records for each "modality" (CT, X-ray, PET, IVR). The controller 21 causes the display 32 of the terminal apparatus 30 to display the cumulative exposure dose for each "modality" and the total value of the cumulative exposure doses corresponding to each of the modalities 40. Here, the controller 21 may display only the cumulative exposure doses for each "modality" that have a relatively high order of priority determined in advance for the "modality".

The same process is performed for "2022".

Figure 10:
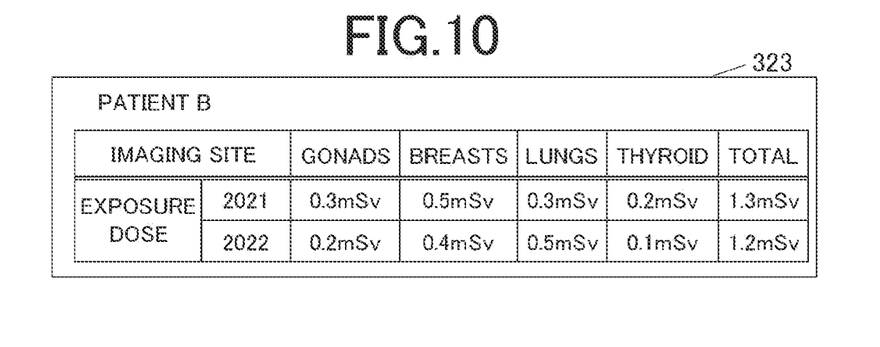
FIG. 10 is an example of a cumulative exposure dose display screen including a cumulative exposure dose calculated for each imaging site.

FIG. 10 illustrates a cumulative exposure dose display screen 323 displayed on the display 32 of the terminal apparatus 30. The cumulative exposure dose display screen 323 is an example of a screen displayed on the display 32 of the terminal apparatus 30 in step S16 of the dose information reference process (see FIG. 7). The cumulative exposure dose calculated for each "imaging site" for "patient B" is displayed on the cumulative exposure dose display screen 323. Here, it is assumed that the periods "2021" and "2022" have been designated.

The controller 21 of the dose management apparatus 20 extracts, from the dose information table 231 in the storage 23, records in which "patient B" is the subject and the imaging date and time is included in "2021". Then, the controller 21 accumulates the exposure doses included in the extracted records for each "imaging site" (gonads, breasts, lungs, thyroid). The controller 21 causes the display 32 of the terminal apparatus 30 to display the cumulative exposure dose for each "imaging site" and the total value of the cumulative exposure doses corresponding to each of the imaging sites. Here, the controller 21 may display only the cumulative exposure doses for each "imaging site" that have a relatively high order of priority determined in advance for the "imaging site".

The same process is performed for "2022".

Next, adjustment of the exposure dose using the tissue weighting coefficient 233 will be described.

Figure 11A:
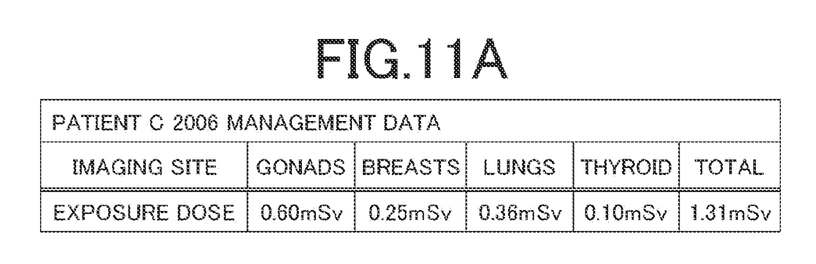
FIGS. 11A to 11C are diagrams for explaining adjustment of exposure dose using a tissue weighting coefficient.

FIG. 11A illustrates an example of exposure doses for each imaging site (gonads, breasts, lungs, thyroid) of the "patient C" managed in the dose information table 231 in the storage 23. This data is from "2006" and has already been adjusted using the tissue weighting coefficients of the 1990 recommendations (see FIG. 4).

Figure 11B:
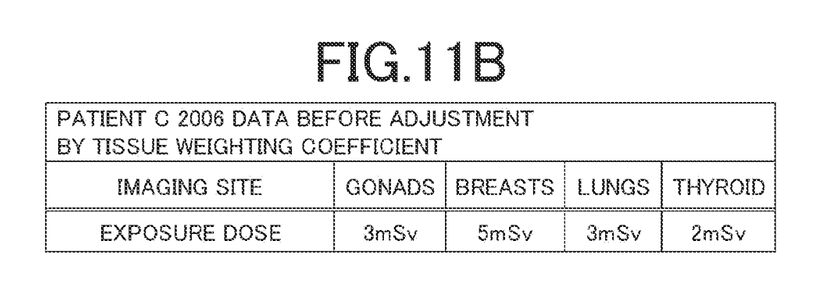

In consideration of the tissue weighting coefficients of the 1990 recommendations, the exposure dose before adjustment by the tissue weighting coefficient 233 is the value illustrated in FIG. 11B. Specifically, the value obtained by dividing the exposure dose illustrated in FIG. 11A by the tissue weighting coefficient of the 1990 recommendations that corresponds to the imaging site is the exposure dose before adjustment.

For example, in the dose information table 231. "0.60 mSv" is managed as the exposure dose for "gonads" of "patient C" in "2006". This "0.60 mSv" is divided by the tissue weighting coefficient "0.20" of the 1990 recommendations for "gonads" to obtain the data "3 mSv" before adjustment.

Figure 11C:
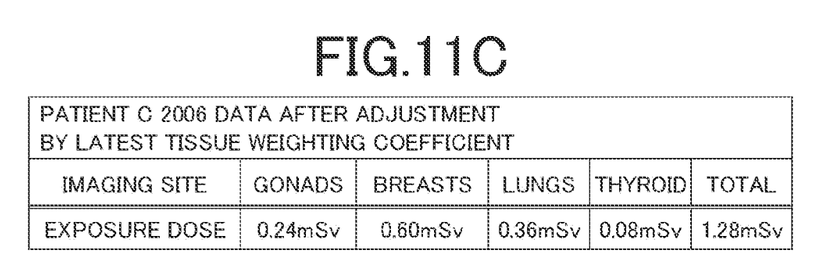

FIG. 11C illustrates the values obtained by multiplying the exposure dose for each "imaging site" in FIG. 11B by the tissue weighting coefficients of the 2007 recommendations (see FIG. 4), and the total value thereof. That is, the values illustrated in FIG. 11C are exposure doses adjusted using the latest tissue weighting coefficient 233.

For example, the data "3 mSv" before adjustment that was calculated for "gonads" of "patient C" in "2006" is multiplied by the tissue weighting coefficient "0.08" of the 2007 recommendations to obtain "0.24 mSv".

The controller 21 of the dose management apparatus 20 may store the value re-adjusted using the latest tissue weighting coefficient 233 in the storage 23 separately from the data illustrated in FIG. 11A.

Note that data pertaining to the exposure dose before adjustment using the tissue weighting coefficient 233 may also be stored in the dose information table 231.

Although adjustment of the exposure dose using the tissue weighting coefficient 233 is described here, the controller 21 can also adjust the exposure dose using the latest coefficient corresponding to the type of radiation as the radiation weighting coefficient 232.

Next, exposure dose decay will be described. Due to the breakdown of nuclides and the metabolism and excretion functions of the human body, the amount of radioactive substances taken into the body attenuates. Assuming that a value obtained by simply accumulating past doses is provided to a patient, there may be a case where the patient does not desire a necessary examination such as CT because the past exposure dose is large.

Figure 12A:
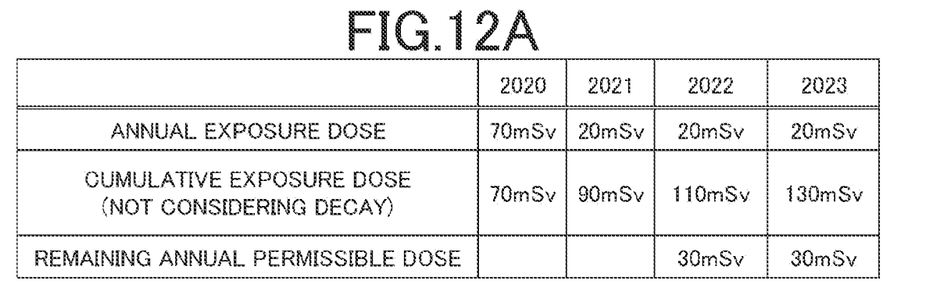
FIGS. 12A and 12B are diagrams for explaining exposure dose decay.

For the "patient D", although the status of examinations performed through 2019 is unknown, the exposure dose in 2020 is "70 mSv", and the exposure dose from 2021 onward is "20 mSv" every year. Further, the annual permissible exposure dose is "50 mSv".

FIG. 12A illustrates the annual exposure dose, the cumulative exposure dose, and the remaining annual permissible dose for each year when the decay of radioactivity is not considered.

By adding the annual exposure dose "20 mSv" for 2021 to the cumulative exposure dose "70 mSv" for 2020, a cumulative exposure dose of "90 mSv" for 2021 is obtained.

Similarly, by adding the annual exposure dose "20 mSv" for 2022 to the cumulative exposure dose "90 mSv" for 2021, a cumulative exposure dose of "110 mSv" for 2022 is obtained. By subtracting the annual exposure dose "20 mSv" for 2022 from the annual permissible dose "50 mSv", a remaining annual permissible dose of "30 mSv" for 2022 is obtained. Similarly, by adding the annual exposure dose "20 mSv" for 2023 to the cumulative exposure dose "110 mSv" for 2022, a cumulative exposure dose of "130 mSv" for 2023 is obtained. By subtracting the annual exposure dose "20 mSv" for 2023 from the annual permissible dose "50 mSv", a remaining annual permissible dose of "30 mSv" for 2023 is obtained.

Figure 12B:
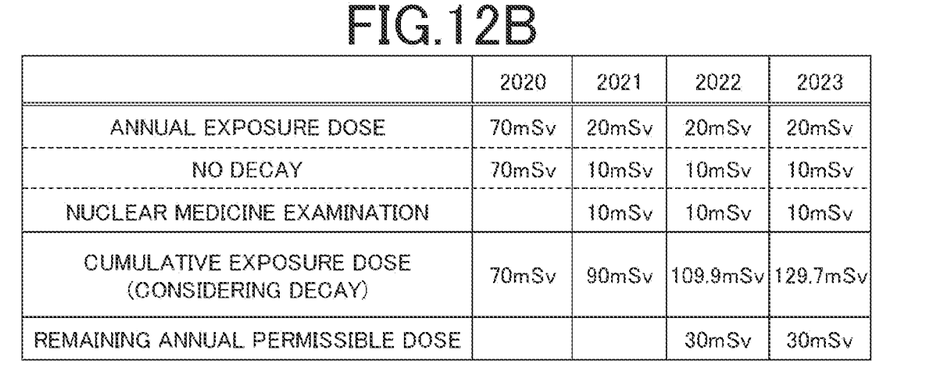

FIG. 12B illustrates the annual exposure dose, the cumulative exposure dose, and the remaining annual permissible dose for each year when the decay of radioactivity is considered. The status of examinations performed on the "patient D" is the same as the content described above. However, of the "20 mSv" annual exposure dose from 2021 onward, "10 mSv" is the unattenuated dose and "10 mSv" is the dose from a nuclear medicine examination. The radioactivity of radioactive substances for nuclear medicine examinations is assumed to attenuate to "99/100" in one year.

Cumulative exposure dose in 2021 =

[annual exposure dose in 2020 (without decay)] +

[annual exposure dose in 2021] = 70 $mSv$ + 20 $mSv$ = 90 $mSv$

Cumulative exposure dose in 2022 =

[annual exposure dose in 2020 (no decay)] +

[annual exposure dose in 2021 (no decay)] +

[annual exposure dose in 2021 (nuclear medicine examination) × 0.99] +

[annual exposure dose in 2022] = 70 $mSv$ + 10 $mSv$ +

9.9 $mSv$ + 20 $mSv$ = 109.9 $mSv$

Cumulative exposure dose in 2023 =

[annual exposure dose in 2020 (no decay)] +

[annual exposure dose in 2021 (no decay)] +

[annual exposure dose in 2021 (nuclear medicine examination) ×

0.99 × 0.99] + [annual exposure dose in 2022 (no decay)] +

[annual exposure dose in 2022 (nuclear medicine examination) × 0.99] +

[annual exposure dose in 2023] = 70 $mSv$ + 10 $mSv$ + 9.8 $mSv$ +

10 $mSv$ + 9.9 $mSv$ + 20 $mSv$ = 129.9 $mSv$

In this way, the controller 21 of the dose management apparatus 20 can obtain the real cumulative exposure dose by considering the decay of radioactivity. If the effect of the decay is significant, the patient will be able to undergo examinations that the patient would have decided to refrain from in the past.

Figure 13:
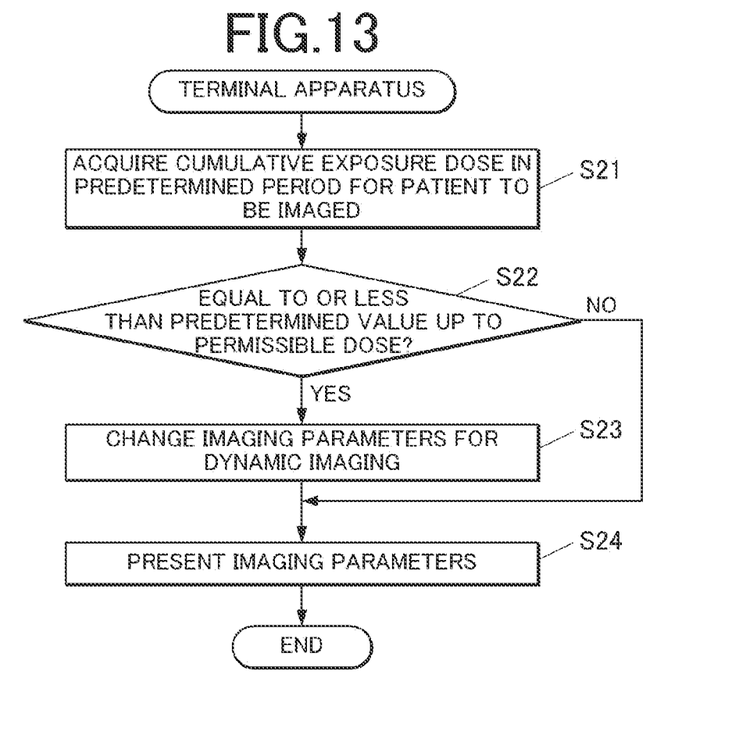
FIG. 13 is a flowchart illustrating a dynamic imaging support process executed in the terminal apparatus.

FIG. 13 is a flowchart illustrating a dynamic imaging support process executed in the terminal apparatus 30. This process is performed by the terminal apparatus 30 serving as, for example, an imaging controller for the DR apparatus 41 when dynamic imaging is performed in the DR apparatus 41.

At the terminal apparatus 30, a user operates the input device 33 to designate a patient (subject) to be imaged and a predetermined period. Then, the controller 21 of the dose management apparatus 20 calculates the cumulative exposure dose in the predetermined period for the patient to be imaged, and outputs the calculated cumulative exposure dose to the terminal apparatus 30.

The controller 31 of the terminal apparatus 30 acquires the cumulative exposure dose in the predetermined period for the patient to be imaged, which was outputted from the dose management apparatus 20 via the communicator 34 (step S21).

Next, the controller 31 obtains the difference between a predetermined permissible dose and the cumulative exposure dose, and determines whether or not the difference is equal to or less than a predetermined value (step S22). The controller 31 may also determine whether or not the current dynamic imaging would cause the cumulative exposure dose after dynamic imaging to exceed the permissible dose.

If the difference between the permissible dose and the cumulative exposure dose is equal to or less than the predetermined value (step S22: YES), the controller 31 changes the imaging parameters for dynamic imaging of the patient (step S23). For example, the controller 31 changes the scheduled dynamic imaging to imaging with part of the examination omitted.

Figure 14:
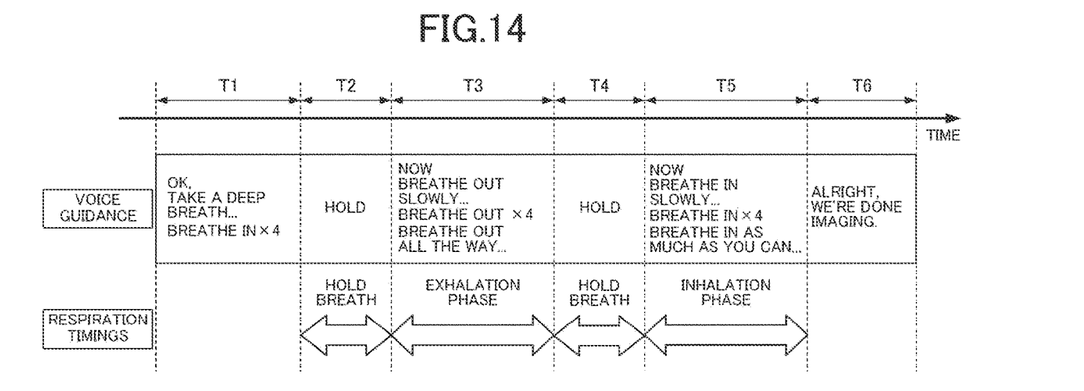
FIG. 14 is a diagram illustrating an example of voice guidance and respiration timings in the case of performing dynamic imaging of the lungs with respiration.

FIG. 14 illustrates an example of voice guidance (automated voice) and respiration timings when performing dynamic imaging of the lungs with respiration. In FIG. 14, the horizontal axis represents the passage of time. The voice guidance provides the patient with voice instructions about how to breathe during imaging.

In a time period T1, the voice guidance instructs the patient to breathe in.

In a time period T2, the voice guidance instructs the patient to hold their breath.

In a time period T3, the voice guidance instructs the patient to breathe out.

In a time period T4, the voice guidance instructs the patient to hold their breath.

In a time period T5, the voice guidance instructs the patient to breathe in.

In a time period T6, the voice guidance notifies the patient that imaging has ended.

Normally, imaging (irradiation) is performed from the start of the time period T2 to the end of the time period T5.

One example of "imaging with part of the examination omitted" is to cancel the holding of the breath. That is, the irradiation time of radiation is shortened by excluding the time periods T2 and T4 corresponding to the holding of the breath. Specifically, the exhalation in the time period T3 is performed immediately after the inhalation in the time period T1, and the inhalation in the time period T5 is performed immediately after the exhalation in the time period T3.

Another example of "imaging with part of the examination omitted" is to cancel the imaging of inhalation. That is, the irradiation time of radiation is shortened by excluding the time period T5 corresponding to inhalation. Specifically, imaging ends immediately after the holding of the breath in the time period T4.

After step S23, or if the difference between the permissible dose and the cumulative exposure dose is greater than the predetermined value in step S22 (step S22; NO), the controller 31 presents the imaging parameters (step S24). Specifically, the controller 31 causes the display 32 to display the imaging parameters. For example, the controller 31 proposes imaging parameters with part of the examination omitted to thereby shorten the irradiation time.

Note that when the difference between the permissible dose and the cumulative exposure dose is greater than the predetermined value, that is, when there is a marginal remaining dose up to the permissible dose, the controller 31 presents the imaging parameters as scheduled without changing the imaging parameters.

Then, the dynamic imaging support process ends.

In the dynamic imaging support process (see FIG. 13), the controller 31 may cause the display 32 to display the remaining dose up to the permissible dose on the basis of the cumulative exposure dose in the predetermined period for the patient to be imaged.

The controller 31 may also cause the display 32 to display a warning or generate a warning sound when the cumulative exposure dose in the predetermined period for an individual patient exceeds a predetermined threshold value.

The controller 31 may also cause the display 32 to display a warning or generate a warning sound in the case where adding the dose from the current dynamic imaging would cause the cumulative exposure dose in the predetermined period for an individual patient to exceed a predetermined threshold value.

A healthcare professional such as a doctor or a radiographer explains to the patient to be imaged that the cumulative exposure dose in the predetermined period exceeds the predetermined threshold value or is likely to exceed the threshold value.

As described above, according to the present embodiment, the dose management apparatus 20 calculates the cumulative exposure dose obtained by accumulating the exposure doses for which the imaging date and time is included in the predetermined period among the managed exposure doses, and outputs the cumulative exposure dose. Therefore, the dose management apparatus 20 can provide the user (doctor or patient) with an appropriate exposure dose.

In addition, the dose management apparatus 20 calculates the total exposure dose obtained by summing up only the external exposure doses and outputs the total exposure dose, thereby excluding internal exposure doses from the output.

Furthermore, from the terminal apparatus 30, the user can designate a period of time going back into the past from the latest radiographic imaging as the predetermined period of time for calculating the cumulative exposure dose.

In addition, from the terminal apparatus 30, the user can designate the predetermined period for calculating the cumulative exposure dose in units of months or years.

In addition, the dose management apparatus 20 manages exposure doses in association with the My Number of the patient (subject), so that the patient can be easily identified and long-term/ongoing management of exposure dose can be achieved.

In addition, the controller 21 adjusts exposure doses within the predetermined period using the latest coefficients related to the influence of radiographic imaging, so that an exposure dose suitable for the current point in time can be evaluated even when the coefficients are changed.

Note that the timing of adjusting exposure doses using the latest coefficients related to the influence of radiographic imaging may be when the cumulative exposure dose is outputted or when the coefficients are changed. In the case of readjusting exposure doses when the coefficients are changed, the controller 21 of the dose management apparatus 20 causes the storage 23 to store the readjusted exposure doses separately from the data before adjustment.

Furthermore, if the units of exposure doses within the predetermined period are not the same, the controller 21 can convert the exposure doses into a single unit of radiation before calculating the cumulative exposure dose.

The dose management apparatus 20 manages exposure doses for each imaging site in the dose information table 231. Therefore, the controller 21 can calculate the cumulative exposure dose separately for each imaging site or extract only the exposure doses corresponding to a specific imaging site.

Further, the dose management apparatus 20 manages exposure doses for each modality 40 in the dose information table 231. Therefore, the controller 21 can calculate the cumulative exposure dose separately for each modality 40 or extract only the exposure doses corresponding to a specific modality 40.

In addition, the terminal apparatus 30 (dynamic imaging support apparatus) can acquire the cumulative exposure dose outputted from the dose management apparatus 20, identify imaging parameters for dynamic imaging of the subject on the basis of the cumulative exposure dose, and present the imaging parameters. For example, the controller 31 can adjust the exposure dose from new imaging by changing the imaging time of the dynamic imaging according to the cumulative exposure dose. Since the dose management apparatus 20 properly manages exposure dose for each patient, the effects on health can be taken into consideration and reflected in the planning of future imaging.

Note that the description in the above embodiment is an example of an exposure dose management system according to the present invention, and the present invention is not limited thereto. The detailed configuration and detailed operation of each apparatus included in the system can be modified, as appropriate, without departing from the scope of the present invention.

For example, in the above-described embodiment, when the user designates the patient and the predetermined period, the dose management apparatus 20 accumulates exposure doses and outputs the cumulative exposure dose. Alternatively, the dose management apparatus 20 may calculate the cumulative exposure dose obtained by accumulating exposure doses at a predetermined timing.

Furthermore, the dose management apparatus 20 may periodically calculate the cumulative exposure dose for each patient and store the cumulative exposure dose in the storage 23 separately from the data in the dose information table 231.

In the above-described embodiment, the dose management apparatus 20 associates exposure doses with a My Number. Alternatively, exposure doses may be associated with a My Number by a combination of the dose management apparatus 20 and another apparatus. Specifically, exposure doses may be associated with patient identification information such as a patient ID in the dose management apparatus 20, and another apparatus may keep a correspondence relationship between the patient identification information and a My Number.

Further, exposure doses managed by the dose management apparatus 20 may include not only exposure doses from radiographic imaging but also exposure doses from radiation therapy.

Furthermore, in the above-described embodiment, the predetermined period is designated from the terminal apparatus 30. Alternatively, the dose management apparatus 20 may include an input device for designating the predetermined period, and the exposure dose management system may be formed from the dose management apparatus 20 alone.

The exposure dose management system may also be formed from the dose management apparatus 20 and the image management apparatus 10.

The exposure dose management system may or may not include the modality 40.

Further, the image management apparatus 10 and the dose management apparatus 20 may be the same apparatus.

The image management apparatus 10 and the dose management apparatus 20 may also be located in a cloud environment.

In the above-described embodiment, the dose management apparatus 20 associates an exposure dose with an examination ID or the like, but an exposure dose may also be managed in association with a medical image (SOP instance UID or the like). Furthermore, the dose management apparatus 20 may manage exposure doses as information pertaining to dose alone.

The above description discloses an example of using ROM as a computer-readable medium storing a program for executing processes, but the present invention is not limited to this example. Other applicable computer-readable media include nonvolatile memory such as flash memory, and portable recording media such as CD-ROM. Furthermore, a carrier wave may be applied as a medium for providing program data via a communication line.

Although embodiments of the present invention have been described and illustrated in detail, the disclosed embodiments are made for purposes of illustration and example only and not limitation. The scope of the present invention should be interpreted by terms of the appended claims.

The invention claimed is:

1. An exposure dose management system comprising a first hardware processor that:
manages exposure doses that a subject has received through imaging by a radiographic imaging apparatus in association with an imaging date and time;
accepts a designation of a predetermined period;
calculates a cumulative exposure dose obtained by accumulating exposure doses for which the imaging date and time corresponding to each exposure dose is included in the predetermined period from among the exposure doses managed by the first hardware processor; and
outputs the cumulative exposure dose.

2. The exposure dose management system according to claim 1, wherein:
the exposure doses include external exposure doses and internal exposure doses;
the first hardware processor calculates a total exposure dose obtained by summing only the external exposure doses among the exposure doses; and
the first hardware processor outputs the total exposure dose.

3. The exposure dose management system according to claim 1, wherein the predetermined period is a period going back into the past from a latest radiographic imaging.

4. The exposure dose management system according to claim 3, wherein the predetermined period is in units of months or years.

5. The exposure dose management system according to claim 1, wherein the first hardware processor manages the exposure doses in association with a My Number(R) of the subject.

6. The exposure dose management system according to claim 1, wherein the first hardware processor adjusts exposure doses within the predetermined period using a latest coefficient related to an influence of radiographic imaging.

7. The exposure dose management system according to claim 1, wherein the first hardware processor calculates the cumulative exposure dose after first converting exposure doses within the predetermined period into a single unit of radiation.

8. The exposure dose management system according to claim 1, wherein the first hardware processor manages the exposure doses by imaging site.

9. The exposure dose management system according to claim 1, wherein the first hardware processor manages the exposure doses by radiographic imaging apparatus.

10. A dynamic imaging support apparatus comprising a second hardware processor that:
   acquires a cumulative exposure dose outputted from the exposure dose management system according to claim 1; and
   identifies imaging parameters for dynamic imaging of the subject on a basis of the cumulative exposure dose, and presents the imaging parameters.

11. A non-transitory computer-readable medium storing a program for causing a computer to perform:
   managing exposure doses that a subject has received through imaging by a radiographic imaging apparatus in association with an imaging date and time;
   accepting a designation of a predetermined period;
   calculating a cumulative exposure dose obtained by accumulating exposure doses for which the imaging date and time corresponding to each exposure dose is included in the predetermined period from among the exposure doses managed by the manager; and
   outputting the cumulative exposure dose.

12. A dose management method comprising:
   managing exposure doses that a subject has received through imaging by a radiographic imaging apparatus in association with an imaging date and time;
   accepting a designation of a predetermined period;
   calculating a cumulative exposure dose obtained by accumulating exposure doses for which the imaging date and time corresponding to each exposure dose is included in the predetermined period from among the managed exposure doses; and
   outputting the cumulative exposure dose.

* * * * *